United States Patent [19]

Belart

[11] Patent Number: 5,067,779
[45] Date of Patent: Nov. 26, 1991

[54] BRAKING PRESSURE GENERATOR FOR A VACUUM OPERATED BRAKE SYSTEM WITH ANIT-LOCK CONTROL

[75] Inventor: Juan Belart, Moerfelden-Walldorf, Fed. Rep. of Germany

[73] Assignee: Alfred Teves GmbH, Frankfurt Am Main, Fed. Rep. of Germany

[21] Appl. No.: 519,057

[22] Filed: May 4, 1990

[30] Foreign Application Priority Data

May 6, 1989 [DE] Fed. Rep. of Germany ....... 3914955

[51] Int. Cl.⁵ ............................................. B60T 08/44
[52] U.S. Cl. ................................. 303/114 PN; 303/87
[58] Field of Search ................. 303/113, 114, 87, 116, 303/112; 60/557; 91/376 R, 460

[56] References Cited

U.S. PATENT DOCUMENTS

| 4,571,943 | 2/1986 | Gaiser | 91/460 X |
| 4,776,645 | 10/1988 | Seibert et al. | 303/113 |
| 4,787,685 | 11/1988 | Klein | 60/555 X |

FOREIGN PATENT DOCUMENTS 2198201 6/1988 United Kingdom ................. 303/114
2217800 11/1989 United Kingdom ................. 303/114
2219368 12/1989 United Kingdom ................. 303/114

*Primary Examiner*—Robert J. Oberleitner
*Assistant Examiner*—Alfred Muratori
*Attorney, Agent, or Firm*—Robert P. Seitter; J. Gordon Lewis

[57] ABSTRACT

A pedal-actuated braking pressure generator for a brake system with anti-lock control comprising a vacuum-operated servo unit (1), which serves both for boosting the braking force and for generating an auxiliary energy opposed to the pedal force. The system further comprises a master brake cylinder (2) and a piston arrangement (3) connected upstream of the servo unit (1). The piston arrangement comprises a pedal-side piston (15), a reversing valve (18), a pressure transmission chamber (17) and a push-rod piston (19). By a multi-directional valve (5) it is possible to arrest the pedal-side piston (15) during anti-lock control. By means of the reversing valve (18), a pressure medium path is established from the pressure transmission chamber (17) to the pressure compensation reservoir (6), thereby the push-rod piston (19) is relieved in the direction of release of the brake.

4 Claims, 1 Drawing Sheet

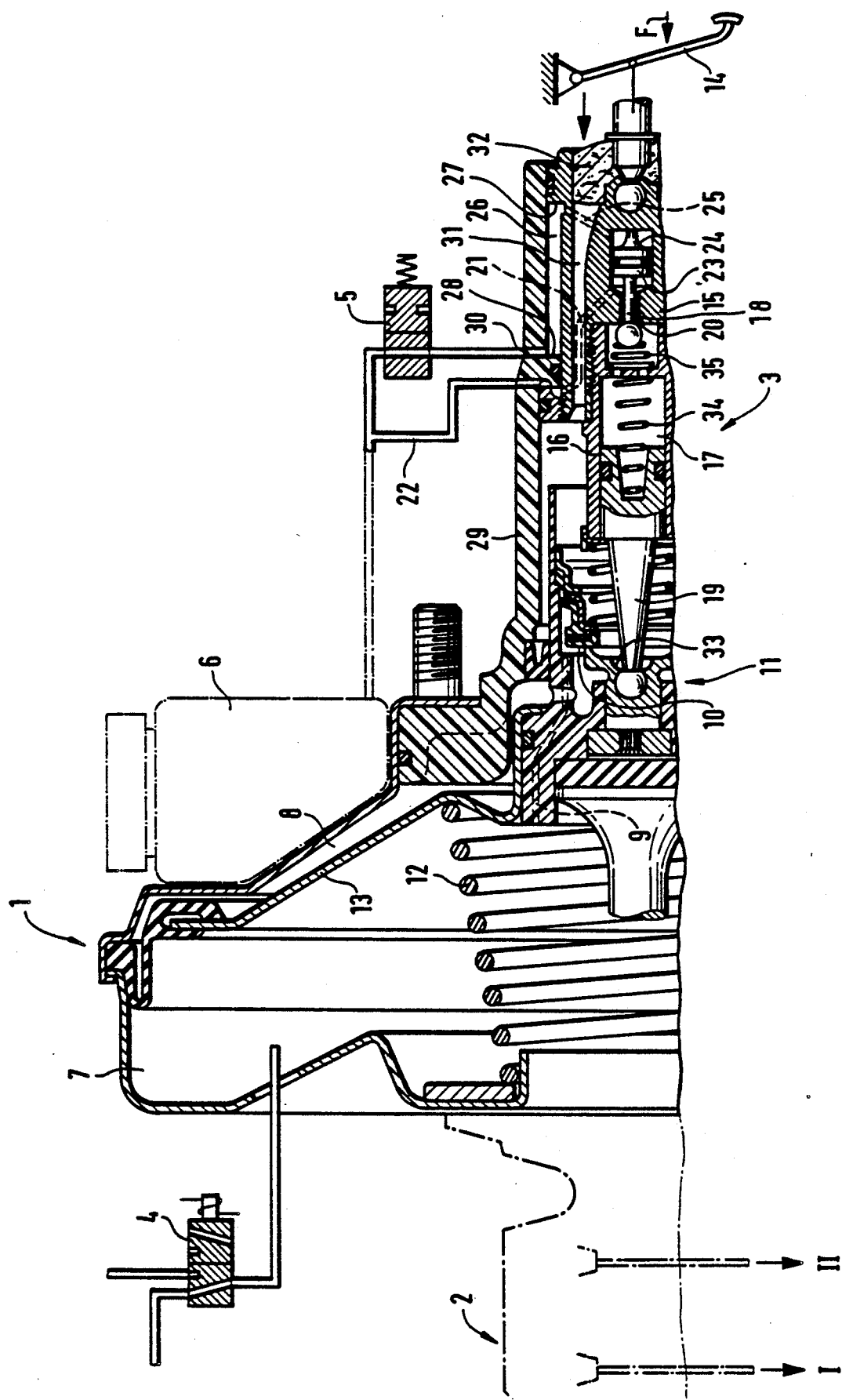

BRAKING PRESSURE GENERATOR FOR A VACUUM OPERATED BRAKE SYSTEM WITH ANIT-LOCK CONTROL

BACKGROUND OF THE INVENTION

This invention relates to a pedal-actuated braking pressure generator for a brake system with anti-lock control comprising a vacuum-operated servo unit which provides both boosting of the braking force and the generating of an auxiliary energy opposed to the pedal force, and of a master brake cylinder connected downstream thereof.

Known braking pressure generators such as German Published Patent Applications (DE-OS No. 33 17 629 and DE-OS No. 34 28 869) use an available vacuum source as a source for the energy required for anti-lock control and for the boosting of the braking force. The servo-unit of these known braking pressure generators is similar to known vacuum brake boosters to a large extent with the specific feature, however, that, by means of the temporary reversal of the pressure conditions in the two working chambers of the servo unit, energy is generated in opposition to the pedal force. In this manner, as soon as any wheel tends to lock because of excessive braking force, a reduction of the braking pressure results and, thereby, a re-stabilization of the course of the wheel. Since in such a device the braking pressure is automatically changed in a like manner in all circuits connected to the master brake cylinder, wheel valves are inserted into the pressure medium paths leading from the master brake cylinder to the wheel brakes. The wheel valves are changed over to lock independently of one another. In accordance with a so-called multiplexing method, namely a consecutively operated method, it is possible to adjust the braking pressure by means of the valves in a known manner individually for each wheel. The vacuum for boosting the braking force and for braking pressure modulation is usually supplied by the suction system of the driving engine of the vehicle. It is possible to manufacture such a brake system at reasonable cost because of the absence of a separate auxiliary energy source and due to the limitation to only three or four wheel valves in all, as a consequence of the multiplex operation.

A disadvantage in brake systems of this type is that during anti-lock control, the auxiliary energy which is opposed to the pedal force retroacts on the brake pedal which is awkward for and may be irritating to the driver. It is thus an object of the present invention to lock the pedal in its position by means of convenient measures upon the onset of anti-lock control and thus to avoid any irritation to the driver which might lead to erroneous reactions. It should be noted that anti-lock control normally comes about or is operative during panicky braking operations and in other dangerous situations.

SUMMARY OF THE INVENTION

It has been found out that this object is achieved by further developing a braking pressure generator of the type referred to wherein the pedal force is transmittable to an inlet valve of the servo unit by way of a piston arrangement connected upstream of the unit and including a pedal-side piston applied by the pedal force, a pressure transmission chamber, reversing valve and a push-rod piston actuating the inlet valve of the servo unit. The reversing valve closes the pressure transmission chamber as long as there is no anti-lock control and upon the onset of anti-lock control, the pedal-side piston is arrestable and with the reversing valve opening a pressure medium path from the pressure transmission chamber to a pressure compensation reservoir and thus releasing the push-rod piston in the direction of release of the brake.

Thus, upon the onset of anti-lock control, according to the present invention the pedal is kept in its momentary position while, at the same time the push-rod piston is relieved so that, by means of a reversal of the pressure conditions in the working chambers of the servo unit, it is possible to reduce the force acting on the master brake cylinder and, hence, the braking pressure. The braking pressure can be modulated in the desired manner by means of corresponding control of the pressure conditions in the servo unit. For the purpose of arresting the pedal-side piston of the piston arrangement, according to one advantageous embodiment of the present invention, a chamber or annular chamber which is confined on the pedal side by a piston surface and which is confined on the opposite side by a housing surface recessed on the periphery of the piston and is connected to the pressure compensation reservoir by way of a multi-directional valve which can be changed over to lock. The (annular) chamber communicates with a control surface of the reversing valve, which control surface effects a switching of the valve upon pressurization or rather an opening of the pressure medium path from the pressure transmission chamber to the pressure compensation reservoir. After the change-over of the multi-directional valve connecting the chamber with the reservoir the pedal force therefore builds up a pressure in said chamber which leads to a switching of the reversing valve.

One advantageous embodiment of the braking pressure generator according to the present invention provides that the reversing valve is arranged within the pedal-side piston and comprises a ball-type seat valve which, in the rest position, is held by a return spring in the closing position and of an actuating piston whose control surface communicates with the (annular) chamber of the pedal-side piston by way of a pressure medium channel.

BRIEF DESCRIPTION OF THE DRAWING

Further characteristics, advantages and applications of the present invention will become evident from the accompanying drawing and the following detailed description of one embodiment. The single figure of the drawing shows the section of a simplified and partial representation of a braking pressure generator and the symbolical representation of appertaining multi-directional valves.

DETAILED DESCRIPTION

The represented braking pressure generator comprises a servo unit 1 with a master brake cylinder 2 connected downstream and a piston arrangement 3 and two multi-directional valves 4, 5. Further, a pressure medium compensation reservoir 6 is represented by broken lines. The fundamental structure of the servo unit 1 represents a traditional vacuum brake booster. The unit is subdivided into two working chambers 7 and 8 out of which, by way of the multi-directional valve 4, working chamber 7 is directly connected to the vacuum source Vac. In the illustrated rest position, that is, with the brake not applied, the chamber 7 communicates with the pedal-side working chamber 8 by way of an internal channel 9. Upon an application of the brake, the channel 9 becomes locked by a poppet valve 10 forming a component of an arrangement referred herein as inlet valve 11. A piston return spring 12 maintains a working piston 13 in its rest position with the working piston 13 separating the two working chambers 7, 8.

The braking force F applied to a brake pedal 14 is transmitted to the inlet valve 11 by way of the piston arrangement 3. The piston arrangement is provided with a pedal-side piston 15, an intermediate piece 16 is part of the piston and is connected therewith, such as by means of screwing or threaded engagement, and accommodating a pressure transmission chamber 17, and with a reversing valve 18 and a push rod piston 19 arranged axially displaceably within the intermediate piece 16. The push-rod piston 19 is guided in a sealed manner in the intermediate piece 16. By way of a ball-type seat valve 20 and, as long as the seat valve 20 is open, the pressure transmission chamber 17 communicates by way of a channel 21 within the pedal-side piston 15 and by way of a connection line 22 with the pressure medium compensation reservoir 6. The ball-type seat valve 20 is a component of the reversing valve 18.

Further, the reversing valve 18 has a control piston 23 whose pedal-side control surface 24 communicates with an annular chamber 26 on the periphery of the pedal-side piston 15 by way of a further channel 25 within piston 15. On the pedal side, annular chamber 26 is confined by a stepped surface 27 of the piston 15 and, on the opposite side thereof, it is limited by a housing surface 28 of the housing 29 wherein the piston arrangement 3 is accommodated. The annular chamber 26 communicates with the pressure compensation reservoir 6 by way of a housing channel 30 and via the multi-directional valve 5 which is open in the rest position and can be changed over to close. Finally, an, axially parallel passage 31 is provided in the pedal-side piston 15 through which outside air enters as far as up to the inlet valve 11 of the servo unit 1. The air enters channel 31 through a filter 32 in the direction of the arrow.

The operation of the illustrated braking pressure generator is as follows: Upon brake application and as long as there is no anti-lock control a force corresponding to the pedal force F is transmitted to the inlet valve 11 by way of the piston arrangement 3. The multi-directional valve 5 is opened at this time and therefore atmospheric pressure prevails in the annular chamber 26. Accordingly, the reversing valve 18 remains in the illustrated initial position on the right-hand side under the influence of the return spring 35. This is illustrated inside the intermediate piece 16, and under the action of the pressure forming in the pressure transmission chamber 17, in the position in which the ball-type seat valve 20 closes the pressure transmission chamber 17. Due to the action of force on the inlet valve 11, at first the vacuum channel 9 becomes closed, thereupon a second sealing lip 33 on the poppet valve 10 is opened so that air enters the pedal-side working chamber 8 of the servo unit 1 and a pressure difference forms between the chambers 7 and 8. The pressure difference results in a build-up of braking pressure in the brake circuits I, II of the master brake cylinder 2.

Upon the occurrence of a lock-up tendency and upon the onset of anti-lock control the multi-directional valve 5 is changed over to close. Thereby, the pressure medium volume in the annular chamber 26 is locked in.

The resulting pressure in the annular chamber 26 propagates up to the control surface 24 of the reversing valve 18 and effects an opening of the ball-type seat valve 20. After the displacement of the control piston 23 up to its stop, any further advance of the pedal 14 is not permitted. The pressure medium path between the pressure transmission chamber 17 and the reservoir 6 will be opened, thereby the push rod piston 19 and, hence, the inlet valve 11 is relieved. By means of the multi-directional valve 4 it is then possible to control the pressure reduction and pressure reincrease. In its second operating position the valve 4 connects the atmosphere (instead of vacuum with working chamber 7 and thus brings about a partial or complete pressure compensation. If necessary, the vacuum channel 9 will remain closed in the control phase, thereby maintaining minimum force constituent, acting on the inlet valve 11, during the control phase. In such a case the pressure in chamber 8 remains constant. By controlling the pressure in chamber 7 by means of valve 4 it thereby is possible to generate the desired braking pressure variation in the brake circuits I, II. Any further variants of braking pressure modulation during control are possible, for example, by additionally connecting the pedal-side chamber 8 to a pressure control valve, by inserting a valve into the vacuum channel 9, etc.

For reasons of safety, it is to be ensured in a braking pressure generator of the type described that, even in case of trouble in the vacuum supply, in case of power failure or in case of any other trouble, a pressure medium path remains open from the annular chamber 26 to the reservoir 6 so as to exclude a brake lock-up. These safety requirements readily can be realized in a known manner by a corresponding design of the valve 5, by parallel connection of a second valve 5 or of a plurality of like valves 5, etc.

What is claimed is:

1. A pedal-actuated braking pressure generator for a brake system with anti-lock control, comprising a vacuum-operated servo unit providing both boosting of braking force and generating an auxiliary energy opposed to pedal force and a master brake cylinder connected downstream thereof, wherein the pedal force is transmitted to an inlet valve of the servo unit by way of a piston arrangement connected adjacent said unit and including a pedal-side piston applied by the pedal force, a pressure transmission chamber, a reversing valve and a push-rod piston actuating the inlet valve of the servo unit, with the reversing valve closing the pressure transmission chamber in the absence of anti-lock control and, upon the onset of anti-lock control, the pedal-side piston being arrested and the reversing valve opening a pressure medium path from the pressure transmission chamber to a pressure compensation reservoir, thereby releasing the push-rod piston in a direction opposite of the pedal force.

2. A braking pressure generator as claimed in claim 1, for the purpose of arresting the pedal-side piston, a second chamber having a pedal side and an opposite side, which is confined on the pedal side by a piston surface and which is confined on the opposite side by a piston surface is recessed on the periphery of the piston and is connected to the pressure compensation reservoir by way of a multi-directional valve which is changed over to close.

3. A braking pressure generator as claimed in claim 2, wherein the second chamber hydraulically communicates with a control surface of the reversing valve, which control surface, upon pressurization, effects a switching of the valve and an opening of the pressure medium path from the pressure transmission chamber to the pressure compensation reservoir.

4. A braking pressure generator as claimed in claim 3, wherein the reversing valve is arranged within the pedal-side piston and comprises a ball-type seat valve which, in a rest position, is held by a return spring in a closing position and an actuating piston whose control surface communicates with the second chamber by way of a pressure medium channel.

* * * * *